April 12, 1960     A. E. BLOMQUIST     2,932,102
EARTH MOVING AND BALLAST CARRYING VEHICLE
Filed Sept. 7, 1956     5 Sheets-Sheet 1
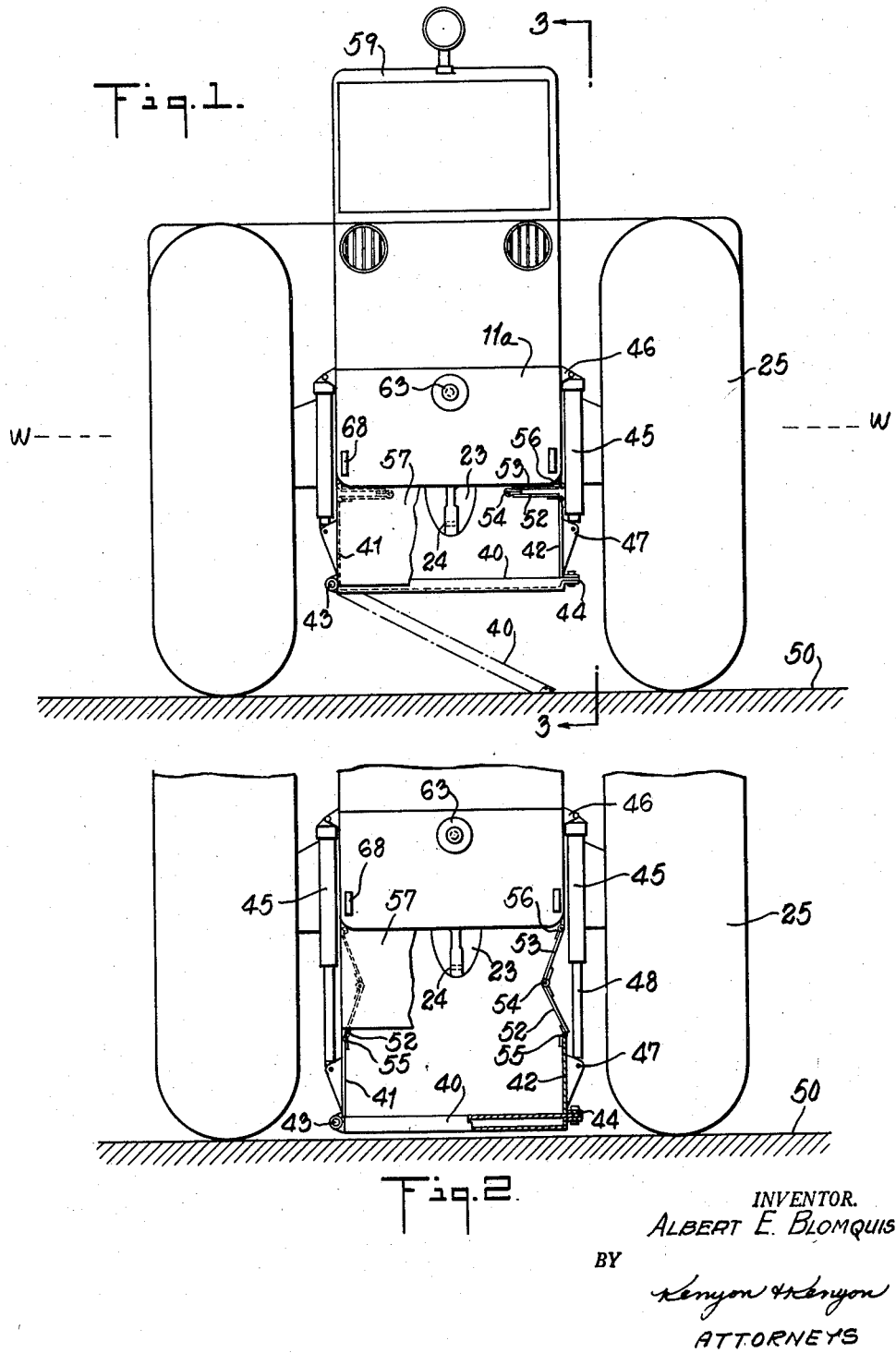
INVENTOR.
ALBERT E. BLOMQUIST
BY
Kenyon & Kenyon
ATTORNEYS

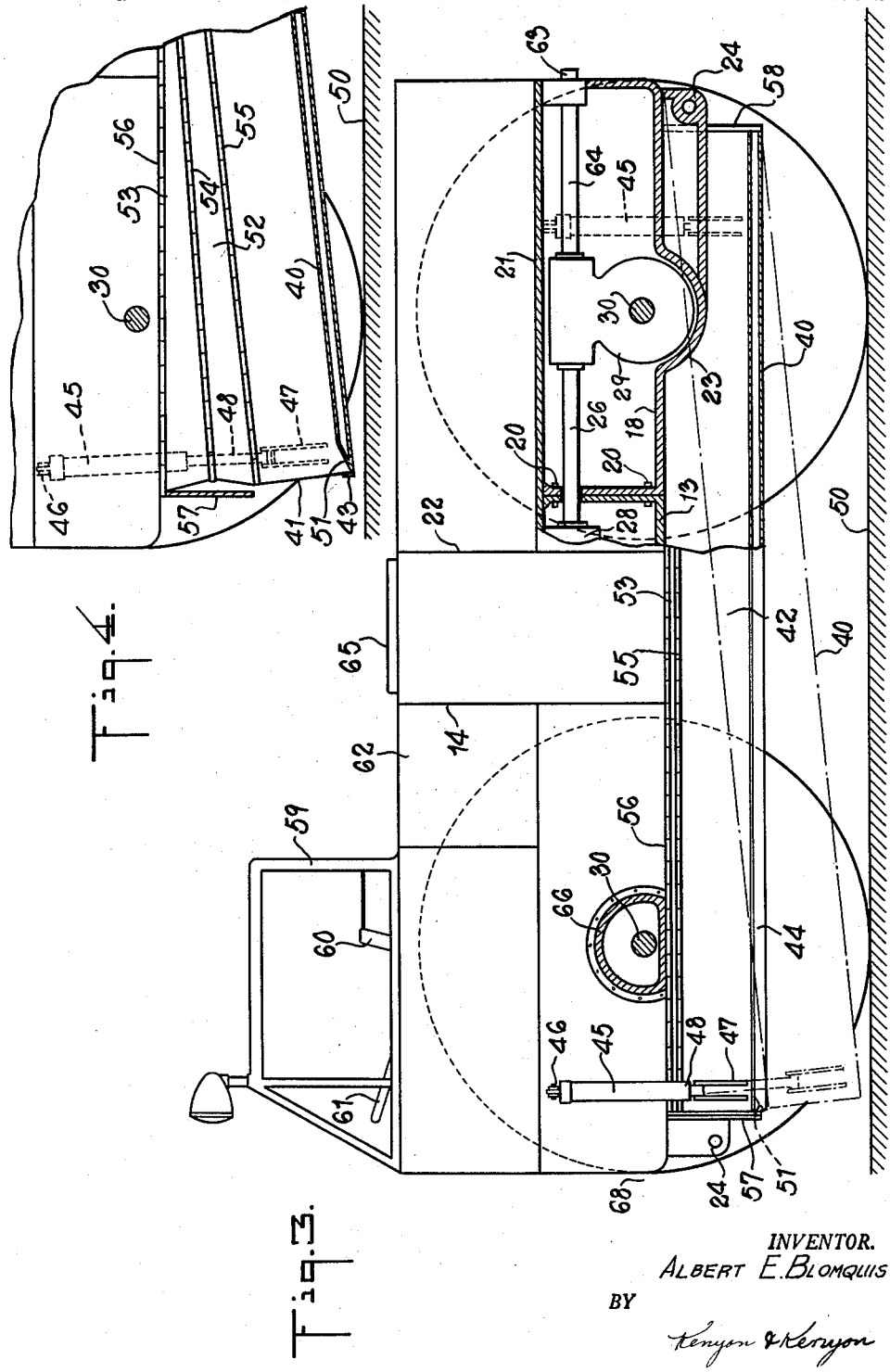

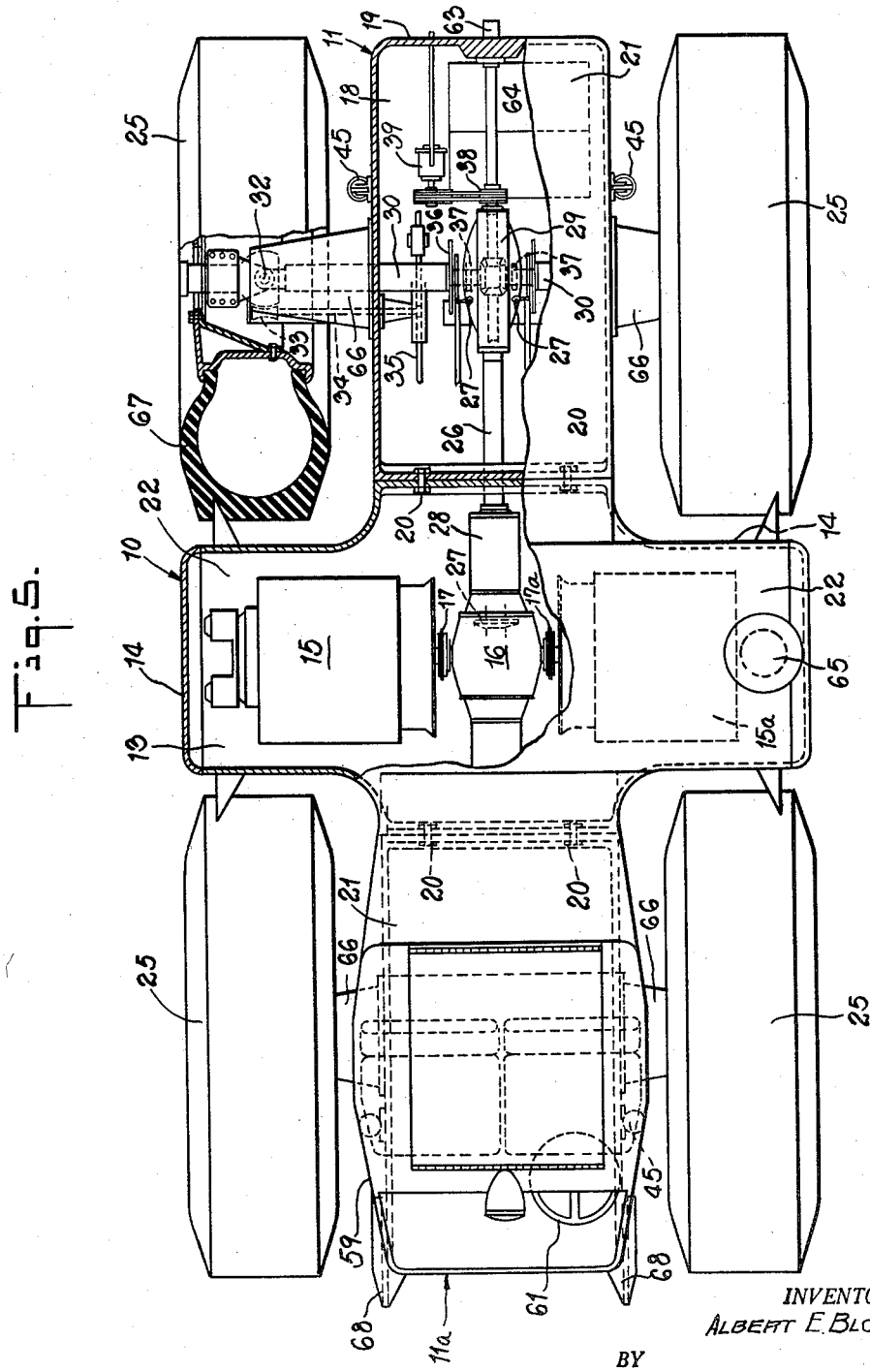

April 12, 1960   A. E. BLOMQUIST   2,932,102
EARTH MOVING AND BALLAST CARRYING VEHICLE
Filed Sept. 7, 1956   5 Sheets-Sheet 4
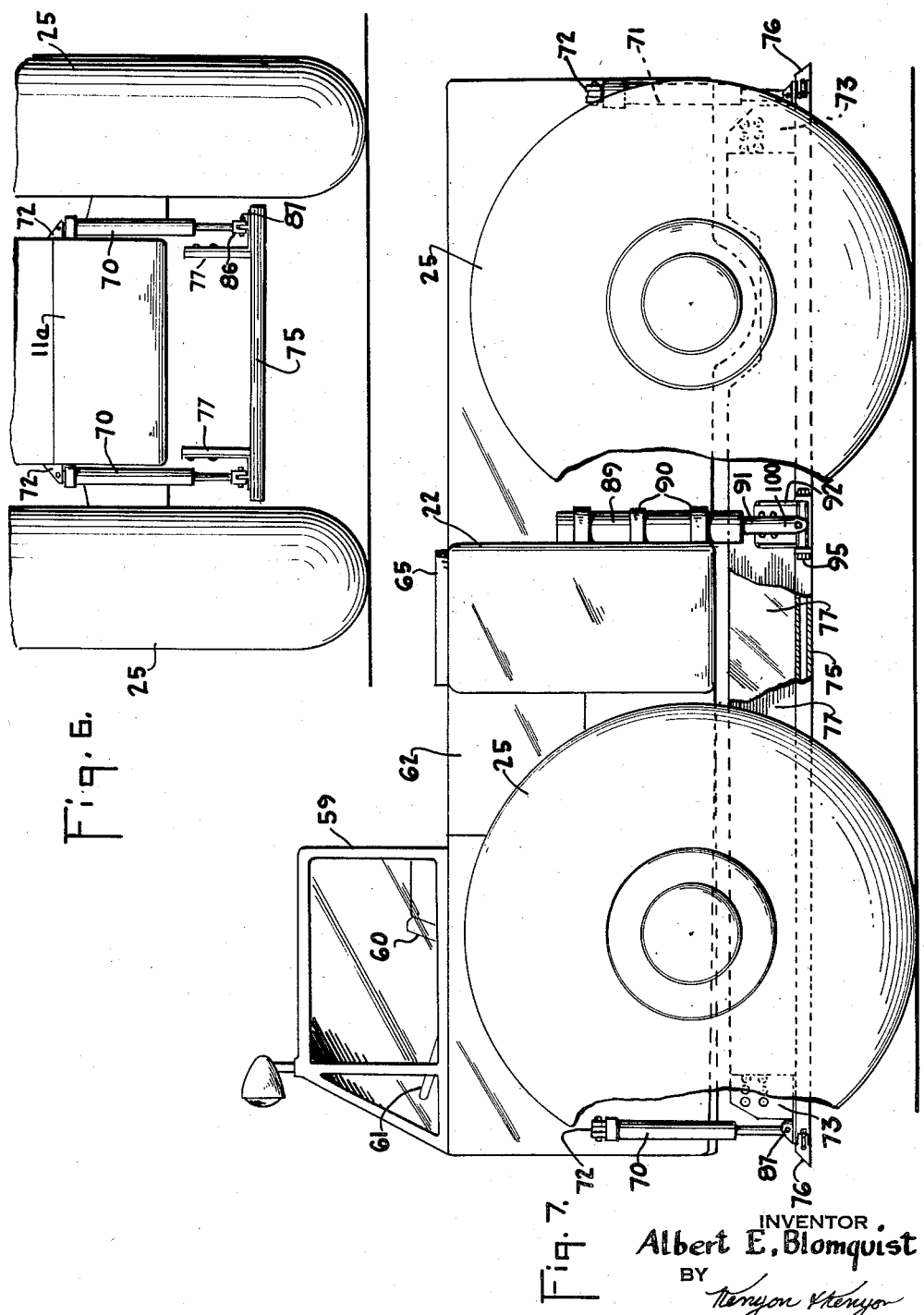
INVENTOR.
Albert E. Blomquist
BY
ATTORNEY April 12, 1960     A. E. BLOMQUIST     2,932,102
EARTH MOVING AND BALLAST CARRYING VEHICLE
Filed Sept. 7, 1956     5 Sheets-Sheet 5

INVENTOR
Albert E. Blomquist
BY
ATTORNEY

2,932,102

EARTH MOVING AND BALLAST CARRYING VEHICLE

Albert E. Blomquist, Ringoes, N.J., assignor to Fairchild Engine and Airplane Corporation, Hagerstown, Md., a corporation of Maryland Application September 7, 1956, Serial No. 608,450

24 Claims. (Cl. 37—126)

This invention relates to vehicles and is principally concerned with self-propelled vehicles adapted for power-supplying and transporting purposes as in the case of a tractor, bulldozer or the like.

It is an object of this invention to provide a self-propelled vehicle which as manufactured is light in weight and which, nevertheless, has the capacity to be effectively used as a tractor, bulldozer, transport or the like. A further object of this invention is to provide such a vehicle which is adapted for use on all kinds of terrain. In preferred embodiments, other objects of this invention are to provide in such a vehicle improved load transporting means and to provide such a vehicle which is amphibious in that it is capable of floating and of being propelled in water as well as on land.

From the standpoint of material and manufacturing costs, the lightness in weight of a vehicle is an important factor. Lightness in weight likewise is important as regards both the cost and facility of shipment. In the case of vehicles used for military purposes cost and facility of shipment are matters of especial concern, especially when shipment has to be by boat or possibly by airplane. Maneuverability under conditions of difficult terrain is also a matter of especial concern in the case of military vehicles. Versatility in use also is a valuable attribute.

It is one of the features of the vehicle of this invention that while it is relatively light in weight as manufactured, it is especially adapted so that whenever it may be desired to do so and wherever the vehicle happens to be located, the weight of the vehicle can be greatly increased so as to increase the load imposed on the power-driven carrying wheels of the vehicle and thereby provide greatly increased traction and effectiveness of the vehicle for application as a tractor, bulldozer or other analogous purpose.

Other more specific features of this invention relate to the special construction of the vehicle whereby underneath the floor of the vehicle body that is carried by the carrying wheels a ballast pan is provided which is adapted for the admission and retention of earth or similar ballast material so as to increase the load on the carrying wheels of the vehicle that are driven by motor means mounted within the vehicle body. Preferably the carrying wheels of the vehicle are rotatably mounted with respect to the side walls of the vehicle body and power-transmitting means is provided within the vehicle body for transmitting power from the motor to a plurality of the carrying wheels of the vehicle so as to minimize exposure of working parts on the outside of the vehicle body. In such case, by providing a ballast compartment underneath the vehicle body within which ballast such as earth may be stored for the purposes stated, the ballast and working parts are isolated from each other. Moreover, the added ballast is so disposed as to impart to the vehicle a low center of gravity, thus affording increased stability as well as increased traction.

Features of preferred construction according to this invention also relates to the provision of a ballast pan such that it is capable of being lowered and raised at at least one end thereof that is disposed transversely to a direction of travel of the vehicle so that a dirt-scooping edge at said end of the ballast pan may be used to scoop up dirt into the ballast pan when said end of the pan is lowered by causing the carrying wheels to be rotated for propelling the vehicle. Preferably the ballast pan is adapted to be lowered and raised at both ends with each end being actuatable independently. Suitable power-actuated lowering and raising units may be used for the purpose. Hydraulically operated units are preferred, although units operated by electric motors also could be used. Since the ballast pan is disposed between the carrying wheels and since the lowering and raising means is such that one or the other or both ends of the ballast pan can be moved so as to be below the ground level on which the carrying wheels rest, the power-actuated lowering and raising units are such that they in combination with the ballast pan may be used to raise the carrying wheels above the ground level, as, for example, when it may be desired to service the tires. For such usage the ballast pan provides a broad supporting means whereby the vehicle may be supported even on very soft ground such as marshy or freshly moved earth.

Further features of this invention relates to the construction of the ballast pan so as to provide a compartment having side walls adapted to retain earth therein regardless of the disposition of the bottom or pan portion of the compartment relative to the vehicle frame or body. Likewise, end walls are provided for the compartment so that earth may be effectively confined between the ballast pan and the floor of the vehicle body with walls disposed thereabout and so that the ballast will not fall out during even violent movements of the vehicle. The mobility of the ballast pan relative to the vehicle enables the operator to move it so as to distribute scooped-up earth with approximate uniformity in the ballast compartment. Preferably the bottom pan of the compartment is hinged to one side wall and is secured to the other side wall so that it may be readily released, thereby permitting quick dumping of the ballast pan when the ballast no longer is needed.

Further features of this invention relate to means whereby the ballast pan may be readily releasable from the vehicle body either with or without the side walls thereof and preferably so that the bottom or pan may be optionally detached from the carrying means together with the side walls thereof or leaving the side walls carried by the vehicle for possible use with another pan. The combination of such means for readily detaching the pan with raising and lowering means for said pan whereby the bottom of the pan may be lowered so as to rest substantially throughout the extent thereof on the ground at the ground level of the wheels provides means whereby the pan may be readily detached and attached even though the pan may be fully loaded. Further features of this invention relate to the provision of a pan having the mobility and utility aforesaid which, nevertheless, is stabilized by extensible strut means so as to withstand horizontally imposed stresses under conditions of heavy use as in scooping up earth onto the pan.

The vehicle of this invention has the further advantage that its structure is such that in preferred embodiments it is suitable for amphibious usage, the floor and wall members of the vehicle body being of watertight construction so as to displace water and provide the desired buoyancy. Preferably the vehicle body is sectional, there being two end sections with a central section therebetween. The central section may be substantially wider than the end section. Motor means is preferably mounted within the central section, there preferably being two motors which are disposed in opposed relation on opposite sides of the center line and which are connected to common power-transmitting means for transmitting power to the carrying wheels. The power-transmitting means extends into each of the end sections of the vehicle body to the side walls of which the carrying wheels are secured. Preferably the two end sections are identical and they are separately fabricated for attachment to the central section during assembly of the vehicle.

The foregoing and further objects, features and advantages of this invention will be apparent from the following description of a typical embodiment thereof which is shown for purposes of illustration in the accompanying drawings, wherein:

Fig. 1 is a front view of the vehicle with certain parts of the ballast compartment shown in section;

Fig. 2 is similar to Fig. 1, but shows the ballast pan in lowered position;

Fig. 3 is a side view of the vehicle with certain of the parts thereof shown in section on the line 3—3 of Fig. 5;

Fig. 4 is a side elevation sectional detail view of the lower front portion of the vehicle on the line 4—4 of Fig. 5 showing the front end of the ballast pan in lowered position;

Fig. 5 is a plan view of the vehicle with certain parts partially removed or broken away;

Fig. 6 is a front view of the lower portion of the vehicle showing an alternative type of ballast pan;

Fig. 7 is a side elevation of the embodiment shown in Fig. 6 with certain parts broken away and others in section;

Figure 8:
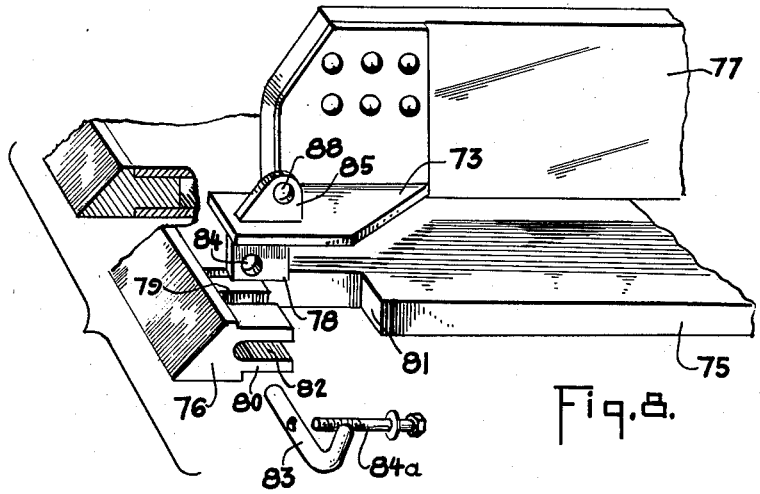
Fig. 8 is a perspective view of a corner of the ballast pan shown in Figs. 6 and 7 showing the parts in separated relation.

In the accompanying drawings certain portions of the vehicle have been indicated largely diagrammatically when such portions do not pertain to the structural features of the invention or are conventional.

The body portion of the vehicle is composed of three sections, the central section 10, the rear section 11 and the front section 11a. Sections 11 and 11a are identical and it is for this reason that the structural detail, in so far as it is regarded as desirable to do so, has been shown only in connection with the rear section 11. The central section 10 of the vehicle body comprises the floor 13 and the wall members 14. The end sections comprise the floor 18 and the wall members 19. The end sections are secured to the opposite ends of the central section 10 by any suitable means such as the bolts 20. In each of the sections the floor and wall members are continuous and provide watertight construction so as to displace water and provide buoyancy. To prevent accidental ingress of water, the end sections may be provided with the cover member 21. Likewise, the central section may be provided with an enclosure 22 for the engines that is watertight except for appropriate openings 65 at the top for cooling air and air used in carburation and for exhaust exit lines. The floor 18 of each end section has a centrally located depressed portion 23 that accommodates the differential 29 and that is carried to the adjacent end of the vehicle to provide the two attaching means which in the form shown has the aperture 24 therein for receiving a tow line, hook or the like. The attaching means 24 may be used when the vehicle is used as a tractor. When the vehicle is used as a bulldozer, suitable means, including members such as the members 68, may be used for attaching a bulldozer blade and its associated mechanisms.

The motor means is mounted in the central section 10 and preferably is composed of the two engines 15 and 15a which are disposed on opposite sides of the common gear box 16 and are operatively connected thereto through the flexible couplings 17 and 17a.

The vehicle comprises the carrying wheels 25 which are rotatably attached to the end sections 11 and 11a of the vehicle body by the housing arm members 66 that are rigidly secured to the side walls of the end sections. Power from the engines 15 and 15a is transmitted to the carrying wheels 25; and in the embodiment shown this is accomplished by taking off power by the power shaft 26 from the gear box 16 under suitable control such as provided by the clutch 27 and the transmission 28. Connections for operating the engine, the clutches, the transmissions, and the like, from the operator's cab have not been shown in the interest of greater simplicity and clarity of the drawings. The power shaft 26 operates the lateral axles or shafts 30 through the differential 29 for supplying power to the wheels 25. The wheels 25 are pivoted at 32 so as to be capable of being steered as by the worm gear 33, the shaft 34, and the shaft 35 which is connected to the steering wheel 61. If desired, a power booster may be employed to assist the steering. Preferably the vehicle is such that it can be steered by the back wheels or by the front wheels or by the back and front wheels together as by the means just mentioned. Power may be transmitted selectively to the different carrying wheels 25 through the clutches 36. The wheels may be braked by the brakes 37 which, it may be noted, are within the end sections. One or more power take-offs may be supplied such as the power take-off 38 from which, for example, an air compressor 39 may be operated as may be desired.

The ballast pan is disposed underneath the floor of the vehicle body between the wheels 25, and in the embodiment shown in Figs. 1 to 5 is in the form of the bottom pan 40 which is combined with side wall members and end members to provide a compartment for retaining earth or similar ballast material. As shown most clearly in Figs. 1, 2 and 4, the pan 40 is secured to the side wall member 41 by a longitudinally disposed hinge 43 and is secured to the side wall member 42 by the quickly releasable securing means 44 such as a slide lock, removable pins, or the like. When the means 44 is released, one side of the pan 40 can be dropped to the position shown in dotted lines in Fig. 1 so as to thereby quickly dump the ballast whenever it may be desired to do so. Normally the pan 40 is in the position shown in solid lines in Fig. 1. The quick dumping means provided by the hinge 43 and the releasable lock means 44, while preferable, is not essential.

The side wall members 41 and 42, and thereby also the pan 40 are held in position by the lowering and raising units 45 which are secured to the side walls 19 of the end sections 11 and 11a by the brackets 46 and to the side wall members 41 and 42 of the ballast compartment by the brackets 47. While these units may take any suitable form, that shown in the drawings which comprises the hydraulically actuated pistons 48 is preferred. For permitting preferred flexibility of movement each of the pistons 48 is connected to its bracket 47 by a universal hinge. The connections, controls, and source of fluid under pressure for hydraulically actuating the pistons 48 in each direction have not been shown for simplicity and clarity in the drawings. Suitable connections and controls are conventional. In Fig. 1, and by solid lines in Fig. 3, the side wall members 41 and 42 of the pan 40 are shown in the normally raised position. The units 45 are selectively actuatable so that either or both ends of the pan 40 may be lowered or raised.

In Figs. 1 to 4 the ground level is indicated at 50. Whenever it may be desired to load the ballast pan with earth, then one end of the pan 40 may be lowered. At at least one end of the pan 40 there is an earth-scooping edge 51 which is disposed transversely to a direction of travel of the vehicle. In Figs. 2 and 4, and in dotted lines in Fig. 3, the forward end of the pan 40 is shown in substantially lowered position. Preferably the units 45 are such that the earth-scooping edge 51 can be moved substantially below the ground level 50 so that merely by propelling the vehicle forwardly, earth at and below the ground level can be scooped up into the pan 40 to provide the desired ballast. While it is not essential that both ends of the pan 40 be capable of being lowered and raised in the manner described and as provided according to the exemplified embodiment, it is preferable that this be the case. When each end of the pan 40 is capable of being selectively lowered and raised, the pan 40 can be made so that it may be loaded from either end. Moreover, having loaded the pan from one end, the pan can then be rocked back and forth so as to cause earth scooped up at one end to be moved to the other end and to be distributed with better uniformity along the pan. When both ends of the pan can be forced downwardly below the ground level, the entire vehicle can be supported by the pan so as to facilitate servicing of the wheels, and in such case the pan will provide a broad support that is effective on soft terrain. Of course, it is also possible to selectively elevate either the front or the rear pair of wheels relative to the ground level by forcing one end only of the pan 40 downwardly below the ground level while the vehicle is stationary.

In order to more effectively keep the scooped-up earth on the pan 40 and within the side walls 41 and 42 when the pan 40 is in lowered position, the elongated plate members 52 and 53 are employed which are hinged together by an elongated hinge 54 which may be of the so-called "piano" type. The plate member 52 is hingedly connected to the upper margin of each of the side wall members 41 and 42 by the hinge 55 and the plate members 53 are hingedly attached to the margins of the floor 18 of the end sections 11 and 11a by the elongated hinges 56. The plate members 52 and 53 fold inwardly as shown most clearly in Fig. 1 when the pan 40 is in elevated position and become unfolded when either or both ends of the pan 40 is or are caused to become lowered as shown most clearly in Figs. 2 and 4. In this manner the continuous side walls are maintained for the ballast compartment at all times during the lowering and raising of the pan 40.

At the forward end of the ballast compartment there is the front retaining wall member 57 which is secured by any suitable means (not shown) to the underside of the floor 18 of the front end section 11a of the vehicle body and which serves to keep the earth or ballast within the ballast compartment when the pan 40 is in the raised position shown in solid lines in Fig. 1 and in solid lines in Fig. 3. A corresponding rear retaining wall member 58 may be similarly secured to the underside of the floor 18 of the rear end section 11 of the vehicle body. In such case the rear end of the pan 40 may be provided with a dirt-scooping edge corresponding to the dirt-scooping edge 51 at the front end; and dirt can be scooped up while backing the vehicle. Alternatively and preferably, the retaining wall member 58 is secured to the side wall members 41 and 42 rather than to the floor 18 of the end section 11 so that the retaining wall member 58 is lowered and raised at the same time that the rear end of the pan 40 is lowered and raised. In such case after earth has been scooped up on the front end of the pan 40, the front end of the pan may be raised and the rear end lowered so as to cause the scooped-up earth to move to the back of the pan 40 where it is kept from falling out by the member 58. If desired, more earth can then be scooped up onto the front of the pan and the operation repeated until the compartment has been filled as much as possible. During such manipulations the distribution of the earth in the ballast pan can be assisted by rocking the vehicle as a whole back and forth.

The foregoing description includes the principal elements of structure which in combination and subcombination characterize this invention. In addition thereto the vehicle may also comprise whatever elements of structure may be regarded as desirable for the particular use to which the vehicle is to be put. For example, it is normally desirable to provide a cab 59 for protecting the operator's seat 60, the steering wheel 61 and the other control mechanisms that are under the control of the operator. Because such mechanisms are conventional, the control mechanisms whereby the operator may control the operations of the engines, the transmissions, the clutches, the brakes, the lowering and raising units 45, etc., have not been shown in the drawings. A fuel tank 62 may be disposed behind the cab 59. The cover member or plate 21 that overlies the rear end section 11 of the vehicle body may be used for a utility platform or for mounting additional equipment or for any other purpose. If desired, a removable auxiliary fuel supply tank could be carried on this platform if a very large fuel supply were desired for special purposes.

The vehicle that has been described hereinabove for purposes of illustration is such that it can be made so as to have a shipping weight of approximately 11,000 pounds. As such, it can be economically transported by usual means of conveyance such as a ship, a flat car, a motor-transport or the like; or under its own power. When under its own power the vehicle possesses extremely great maneuverability on all kinds of terrain. It likewise is amphibious. In Fig. 1 the line W—W indicates the approximate water line. When floating in water the vehicle can be propelled by rotation of the wheels 25. Additional propulsion can be provided by attaching a propeller to the power take-off 63 that is connected by the shaft 64 to the differential 29 for optional operation from the motors 15 and 15a.

If it is desired to use the vehicle as a tractor or for pushing the blade of a bulldozer, the light shipping weight of the vehicle does not provide sufficient traction for making full use of the power supplied by the motors. In such case, all that is required after the vehicle has been transported to a desired destination is to lower the front end of the pan 40 and propel the vehicle forward so as to scoop up earth into the ballast compartment. In this way about 10,000 pounds of ballast can be added, thus nearly doubling the shipping weight of the vehicle; and this ballast is retained effectively notwithstanding the motions of the vehicle during its operations. Moreover, the ballast is carried so as to be confined between the ballast pan and the underside of the floor of the vehicle body. As so confined, the ballast is in a favorable position in providing a low center of gravity. Moreover, because the vehicle is so designed that the working parts are within the vehicle body above the floor thereof, while the ballast is confined in the compartment below the floor, the working parts are at all times effectively protected whether or not earth is used for ballast. The working parts are also effectively protected from water. When the ballast is taken on, it in no way interferes with all normal aspects of utility of the vehicle.

By virtue of the fact that the construction is such that the wheels 25 are of relatively large diameter, the tires 67 are such that they may be operated while partially filled with water. When the tires 67 are filled only with air, they contribute materially to the buoyancy of the vehicle for amphibious uses. By partially filling the tires 67 with water an additional ballast weight of about 19,000 pounds may be availed of. In such case the weight of the vehicle, with the ballast pan full of earth and water introduced into the tires, is about 40,000 pounds. It is apparent that this additional ballast can be provided at almost any location, for all that is needed is earth and water to provide the additional ballast. On the other hand, the additional ballast can be readily jettisoned whenever it may be desired to do so, thus restoring the vehicle to its shipping weight of about 11,000 pounds.

An alternative embodiment of this invention is shown in Figs. 6 to 10. The vehicle body and the carrying wheels therefor may be identical with the embodiment described hereinabove in connection with Figs. 1 to 5 and where corresponding parts are shown in Figs. 6 to 10 like reference characters have been employed.

The embodiment of this invention that is shown in Figs. 6 to 10 is characterized by the employment of a pan which is so constructed and combined with raising and lowering means therefor that the pan may be brought to rest throughout substantially the entire extent of the bottom of the pan on the ground at the ground level of the vehicle wheels and the pan is so combined with the carrying means that it may be readily detached and reattached while resting on the ground and either with or without side wall means for retaining material on the pan.

In the embodiment shown the raising and lowering means by which the pan is supported preferably are hydraulically power actuated by suitable means (not shown) under the control of the operator of the vehicle. Power actuated raising and lowering units are disposed adjacent each end of the pan. Those at the front of the pan and adjacent the front of the vehicle are indicated by the reference character 70. Those at the rear of the pan are indicated by the reference character 71. The units 70 and 71 are swingably secured to the vehicle body from the brackets 72.

In the embodiment shown in Figs. 6 to 10 the pan 75 is substantially flat and at each end there is a steel cutting edge 76 which is adapted to scoop earth onto the pan when the end of the pan carrying the cutting edge is lowered and the vehicle is advanced so as to bring the cutting edge to bear against the earth.

Along each of the sides of the pan 75 there is an upstanding side wall 77. Each end of each side wall 77 is provided with a bracket 73 which is provided with an integral depending fastening member 78 adapted to fit into the vertically disposed slot 79 in the back portion 80 of the cutting edge 76. The pan 75 is cut away at 81 so as to facilitate the lowering of the member 78 so that it may be advanced into the slot 79 either vertically downwardly or from the rear of the cutting edge toward the front of the cutting edge. For holding the member 78 in the vertical slot 79 a horizontally disposed slot 82 is provided in the rear portion 80 of the cutting edge 76 which is adapted to receive the pin 83 for penetration through the hole 84 in the member 78. When the pin 83 is inserted in the slot 82 so as to penetrate the hole 84 in the member 78 the pan 75 will be lifted when the side wall 77, including the bracket 73, is lifted. For holding the locking pin in place a retainer bolt 84a may be employed.

Figure 9:
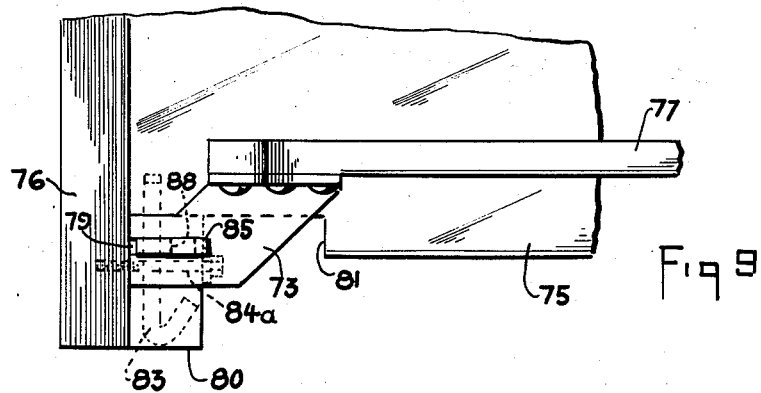
Fig. 9 is a plan view of the parts shown in Fig. 8 when in assembled relation.
Figure 10:
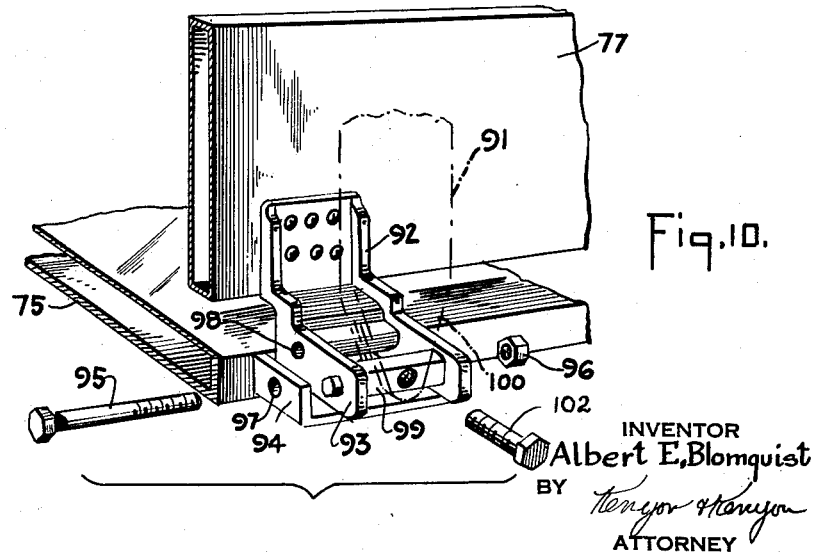
Fig. 10 is a perspective view of side bracket and assembly and suspending means for the ballast pan.

When the parts are in the position shown in Fig. 9 the side wall 77 is secured in upstanding relation to the pan 75. Upstanding from each bracket 73 there is the integral securing member 85 which is adapted to be attached to the lower end of the units 70 and 71. Thus at the lower end of each of the units 70 and 71 there may be a fork 86 which straddles the securing member 85 and is apertured so that a bolt 87 may be passed therethrough and through the aperture 88 in the securing member 85.

By virtue of the foregoing construction quick detachable securing means are provided whereby the side walls may be detached from the raising and lowering units. The raising and lowering units, as in the previous embodiment of this invention, are such that the bottom of the pan may be brought to rest on the ground at the ground level for the wheels of the vehicle. Moreover, for earth-scooping purposes the pan may be lowered still further so that one end or the other may be used for scooping up earth when the vehicle is propelled. The units are selectively actuatable so that each end of the pan may be raised and lowered as desired. Moreover, as with the previously described embodiment, by lowering both ends of the pan at once the entire vehicle may be raised from the ground so that it rests on the pan. However, when the pan is merely resting on the ground it may be readily detached from the raising and lowering units whether or not the pan is loaded with a material such as earth, poles, stones or the like. If it is desired to detach the side walls along with the pan from the raising and lowering units, then the lower ends of the raising and lowering units are disconnected from the securing members 85. Alternatively, if only the pan 75 is to be detached, then the pan 75 may be readily detached from the securing members 78. By reason of the construction above described and shown in Figs. 6 to 10, a pan loaded with some material may be transported, and then lowered so as to rest on the ground and detached so that the vehicle may be free for other uses. Conversely, the pan while separated from the vehicle may be loaded and the vehicle then maneuvered into position over it so that the pan may be secured to the raising and lowering units and then elevated so that the loaded pan may be carried from one destination to another; and when added weight is desired for providing greater traction between the wheels and the ground, as when the vehicle is being used as a bulldozer, the desired added ballast is readily available. By providing means whereby only the flat bottom of the ballast pan may be detached leaving the side walls connected with the raising and lowering means, one is enabled to detach the bottom with a load of ballast thereon and maneuver the vehicle so as to clean the ballast off the ballast pan bottom with a bulldozer blade carried by the vehicle. By again maneuvering the vehicle so as to be spotted over the pan bottom, the raising and lowering means and the pan side walls may be lowered for reattachment thereof to the pan bottom. It is thus seen that a single vehicle is provided having highly flexible adaptability to different situations and uses.

While not essential for many uses of the vehicle of this invention, stiffening struts such as the struts 89 may be used that provide greatly improved stability of the pan 75, especially when the pan is subjected to horizontally imposed stresses as, for example, when used to scoop up earth by lowering the cutting edge 76 at one end and causing the vehicle to be propelled so as to move the cutting edge into a body of earth. While only one strut is shown, it is to be understood that there is one on each side of the pan, and more may be used if desired.

The upper portion of each of the struts 89 is rigidly secured to the body of the vehicle as by the brackets 90. The struts are vertically extensible, each strut comprising the vertically movable rod 91, which, while vertically movable so as to accommodate itself to raising and lowering the pan, is firmly held against horizontal movement so as to hold the pan firmly in resisting horizontally imposed stresses.

The struts, similarly to the raising and lowering units, are connected to the pan through the side wall 77 by quick detachable securing means. In the embodiment shown in Figs. 7 and 10, each side wall 77 has a bracket 92 secured thereto. This bracket comprises a U-shaped extension 93 that fits with a U-shaped bracket 94 secured to the pan 75. There are apertures 98 and 97 in the parts 93 and 94, respectively, adapted to be placed in registration and through which the bolt 95 may be passed and held in place by the nut 96 so as to thereby hold the side wall 77 in secured relation to the pan. At the extremity of the extension 93 attaching pin 99 is secured between the walls of the "U" which has opposed flattened faces adapted to be straddled by a yoke 100 at the lower end of the rod 91, the yoke and attaching pin having registrable openings therein for securing same together by the bolt 102. In this way quick releasable securing means is provided for securing the pan to the side walls 77 and for securing the side walls 77 to the struts 89 so that either the pan alone or the pan plus the side walls may be detached and reattached to the vehicle as when the bottom of the pan is lowered so that it and any load contained thereon rests on the ground.

While this invention has been described in connection with particular embodiments, it is to be understood that this has been done for illustrative purposes and that vehicles embodying this invention may be substantially varied within the scope thereof as disclosed hereinabove and set forth in the following claims.

This application is a continuation-in-part of my application, Serial No. 361,177, filed June 12, 1953, now abandoned.

I claim:

1. A self-propelled vehicle which comprises rotatably mounted carrying wheels, motor means, power-transmitting means operatively connecting said motor means with a plurality of said carrying wheels, a body carried by said wheels and adapted to support said motor means and said power-transmitting means, a pan disposed horizontally underneath said body, power actuated raising and lowering means adjacent each end of said pan, said raising and lowering means having upper ends secured to said body and lower ends connected to said pan for supporting said pan, and said raising and lowering means being adapted to selectively raise and lower each end of said pan and to lower the bottom of said pan so as to force the bottom of said pan substantially throughout against the ground at the ground level supporting said wheels and thereby push the vehicle body upwardly so as to be supported from the ground by said pan and said raising and lowering means.

2. A self-propelled vehicle which comprises rotatably mounted carrying wheels, motor means, power-transmitting means operatively connecting said motor means with a plurality of said carrying wheels, a body carried by said wheels adapted to support said motor and said power-transmitting means, a pan disposed horizontally underneath said body, power actuated raising and lowering means adjacent each end of said pan, said raising and lowering means having upper ends secured to said body and lower ends connected to said pan for supporting said pan and being adapted for selectively raising and lowering each end of said pan relative to said body, said raising and lowering means being adapted to lower the bottom of said pan so as to rest substantially throughout on the ground at the ground level supporting said wheels, and said raising and lowering means being connected to said pan at their lower ends by quick releasable securing means whereby said pan when it is lowered by said raising and lowering means so that the bottom thereof rests on the ground may be readily detached from and reattached to said raising and lowering means.

3. A self-propelled vehicle which comprises rotatably mounted carrying wheels, motor means, power-transmitting means operatively connecting said motor means with a plurality of said carrying wheels, a body carried by said wheels adapted to support said motor and said power-transmitting means, a pan disposed horizontally underneath said body, side walls upstanding from opposite sides of said pan, power actuated raising and lowering means adjacent each end of said pan, said raising and lowering means having upper ends secured to said body and lower ends connected to said side walls and being adapted and arranged for selectively raising and lowering each end of said pan relative to said body, and said raising and lowering means being adapted to lower the bottom of said pan so as to rest substantially throughout on the ground at the ground level supporting said wheels, the lower ends of said raising and lowering means being connected to said side walls by first quick releasable securing means and said side walls being connected to said pan by second quick releasable securing means whereby said pan when it is lowered by said raising and lowering means so that the bottom thereof rests on the ground may be readily detached either with or without said side walls from said units and reattached to said units.

4. A self-propelled vehicle which comprises rotatably mounted carrying wheels, motor means, power-transmitting means operatively connecting said motor means with a plurality of said carrying wheels, a body comprising a floor carried by said wheels adapted to support said motor and said power-transmitting means above said floor, a pan disposed horizontally underneath said body, side walls upstanding from opposite sides of said pan, at least four power actuated raising and lowering units, which units are adapted for selectively raising and lowering each end of said pan, said units at their upper ends being secured to said body and at their lower ends being secured by quickly releasable securing means to brackets secured to said side walls, and quickly releasable securing means for securing said pan to said brackets, said raising and lowering units being adapted to lower the bottom of said pan so as to rest substantially throughout on the ground at the ground level supporting said wheels and to raise said pan so as to bring the tops of said side walls adjacent the underside of said floor.

5. A self-propelled vehicle which comprises rotatably mounted carrying wheels, motor means, power-transmitting means operatively connecting said motor means with a plurality of said carrying wheels, a body carried by said wheels adapted to support said motor and said power-transmitting means, a pan disposed horizontally underneath said body, power actuated raising and lowering means adjacent each end of said pan having their upper ends hingedly secured to said body and their lower ends connected to said pan for supporting said pan, longitudinally extensible vertically disposed means intermediate the ends of said pan and on each side thereof having their upper ends rigidly secured to said body and their lower ends connected to said pan for holding said pan against substantial lateral movement relative to said body, said raising and lowering means being adapted to selectively raise and lower each end of said pan.

6. A self-propelled vehicle which comprises a vehicle body having a substantially continuous horizontally disposed floor and confining wall members upstanding from said floor, carrying wheels adapted to carry said vehicle body, means for mounting said carrying wheels for rotation about axes of rotation laterally extending from said side walls above the level of said floor, means comprising a motor which is within said vehicle body and which is operatively connected to said carrying wheels for rotating said wheels and propelling said vehicle, a pan disposed horizontally underneath said floor in substantially spaced relation to the under surface of said floor, side walls upstanding from the opposite sides of said pan, at least four power actuated lowering and raising units arranged for supporting said pan and selectively lowering and raising each end of said pan, the upper margin of said side walls being adjacent the under surface of said floor when said pan is in elevated position, and said raising and lowering units being adapted to lower the bottom of said pan so as to rest substantially throughout on the ground at the ground level supporting said wheels.

7. A self-propelled vehicle which comprises rotatably mounted carrying wheels, motor means, power-transmitting means operatively connecting said motor means with a plurality of said carrying wheels, a body comprising a floor carried by said wheels and adapted to support said motor and said power-transmitting means above said floor, a pan disposed horizontally underneath said floor between said wheels and having upstanding side walls along the opposite sides thereof and an earth-receiving edge at at least one end thereof disposed transversely to the direction of travel of the vehicle, power actuated raising and lowering means adjacent each end of said pan having their upper ends secured to said body and their lower ends connected to said pan for supporting said pan, said raising and lowering means being adapted to selectively raise and lower each end of said pan, to lower the bottom of said pan so as to rest substantially throughout on the ground at the ground level supporting said wheels, and to lower the end of said pan having said earth cutting edge substantially below said ground level.

8. A self-propelled vehicle which comprises rotatably mounted carrying wheels, motor means, power-transmitting means operatively connecting said motor means with a plurality of said carrying wheels, a body comprising a floor carried by said wheels and adapted to support said motor and said power-transmitting means above said floor, a pan disposed horizontally underneath said floor between said wheels having upstanding side walls along opposite sides thereof and an earth-receiving edge at each end thereof disposed transversely to the direction of travel of said vehicle, at least four power-actuated raising and lowering units secured to said body at the upper ends thereof and connected at the lower ends thereof to said pan for supporting said pan, said units being adapted and arranged to selectively raise and lower each end of said pan and to lower each end of said pan to a level below the ground level supporting said wheels.

9. A self-propelled vehicle which comprises rotatably mounted carrying wheels, motor means, means for supporting said motor means from said carrying wheels, power-transmitting means operatively connected between said motor means and a plurality of said carrying wheels for rotating same to propel said vehicle by power supplied by said motor means, a floor disposed underneath said motor means and said power-transmitting means, a ballast pan disposed underneath said floor and between said carrying wheels and having an earth-receiving edge at at least one end thereof that is disposed transversely to a direction of travel of the vehicle, means for lowering and elevating said end of said ballast pan relative to said floor, said end of said ballast pan when lowered being disposed in position adapted to scoop up earth at said edge and onto said ballast pan, and wall means adjacent each side and each end of said pan and extending from said pan substantially to said floor for retaining in position between said pan and said floor when said end of said pan is elevated a quantity of scooped-up earth as ballast which substantially increases the load carried by the said carrying wheels to which said motor is operatively connected by said power-transmitting means.

10. A self-propelled vehicle which comprises a vehicle body having a substantially continuous floor and side wall members upstanding from said floor, carrying wheels adapted to carry said vehicle body, means for mounting said carrying wheels for rotation about axes of rotation laterally extending from said side wall members above the level of said floor, means comprising a motor which is within said vehicle body and which is operatively connected to said carrying wheels for rotating said carrying wheels and propelling said vehicle, a ballast compartment comprising side wall members and a bottom pan disposed underneath said floor of said vehicle body between said wheels, and means for lowering and raising relative to said floor each end of said pan independently of the other end, at least one end of said pan being adapted to scoop up earth thereon when it is in lowered position and said raising and lowering means being adapted to elevate said side walls of said pan so as to be substantially adjacent the under surface of said floor when both ends of said pan are in raised position.

11. A ballast compartment for a vehicle which comprises a bottom pan and side wall members disposed along opposite sides of said bottom pan, support members above each of said side wall members, power actuated means secured to said support members adapted to vary the spacing between said bottom pan and said support members, and two elongated plate members longitudinally hinged to each other interposed between each of said side wall members and the support member thereover, one of which is longitudinally hinged to the side wall member adjacent the upper edge thereof and the other of which is longitudinally hinged to the support member above said side wall member, said plates being adapted to fold inwardly over said bottom pan when said pan is moved upwardly toward said support members by said power actuated means.

12. A ballast compartment according to claim 11 wherein there is an earth-scooping edge adjacent at least one end of said bottom pan and wherein said power actuated means is adapted to selectively lower and raise each end of said pan relative to said support members.

13. A ballast compartment according to claim 11 which comprises a horizontally disposed confining panel disposed in fixed relation to and between said support members and in spaced relation above said bottom pan, and which comprises a retaining end panel which is maintained disposed between said side walls and between said confining panel and said bottom pan adjacent each end thereof when said pan is in elevated position.

14. A self-propelled vehicle which comprises a vehicle body comprising two end sections and a central section therebetween, each of said sections having floor and wall members and said sections being secured together to provide said vehicle body, carrying wheels secured to the opposite sides of said end sections in rotatable relation thereto, motor means mounted in said central section above the floor thereof, power-transmitting means mounted in each of said end sections above the floor thereof and adapted to transmit power from said motor means to said carrying wheels for rotating said carrying wheels and propelling said vehicle, a ballast pan disposed between said carrying wheels underneath the floor of said sections of said vehicle body, support means for said ballast pan which is secured to said vehicle body and to said ballast pan and which comprises a unit disposed on each side of said ballast pan adjacent each end thereof that is power actuatable to lower and raise each end of said ballast pan independently of the other end relative to said vehicle body, said pan being adapted to scoop up earth when one end thereof is lowered, and retaining means for retaining scooped-up earth on said pan as ballast when it is in raised position relative to said vehicle body, thereby increasing the load carried by said carrying wheels.

15. A self-propelled vehicle according to claim 14 wherein each of said sections of said vehicle body is of watertight construction to provide buoyancy, wherein said center section is substantially wider than said end sections, and wherein said units comprised in said support means for said ballast pan are secured to said end sections.

16. A self-propelled vehicle which comprises a vehicle body frame, carrying wheels rotatably mounted on said frame, a pan disposed between said carrying wheels, and means secured to said vehicle body frame and to said pan for moving said pan so as to lower and raise it relative to said vehicle body frame, said last-named means being adapted to move said pan so as to lower it relative to said vehicle body frame for lifting said carrying wheels substantially above ground level and comprising a first pair of power-actuated lowering and raising units adjacent one end of said pan and a second pair of power-actuated lowering and raising units adjacent the other end of said pan, said first and second pairs of power-actuated lowering and raising units being independently actuatable.

17. In a vehicle comprising a vehicle body and carrying wheels for said vehicle body, a ballast compartment secured to said vehicle body and adapted to retain ballast therein, said ballast compartment comprising side walls and a bottom pan, means for lowering and raising each end of said pan relative to said vehicle body between a normally elevated position and a lowered position, at least one end of said pan when in lowered position being adapted for scooping up earth onto said pan upon moving said vehicle in a direction of its normal travel, hinge means by which one side of said bottom pan is secured to one of said side walls of said compartment and quickly releasable latch means by which the other side of said bottom pan is secured to the other side wall of said compartment.

18. A self-propelled vehicle which comprises rotatably mounted carrying wheels, motor means, power-transmitting means operatively connecting said motor means with a plurality of said carrying wheels, a body comprising a floor carried by said wheels adapted to support said motor and said power-transmitting means above said floor, a pan disposed horizontally underneath said body, side walls upstanding from opposite sides of said pan, power actuated raising and lowering means adjacent each end of said pan having their upper ends secured to said body and their lower ends connected to said side walls, hinge means for hingedly securing one side of said pan to one of said side walls and readily releasable securing means for securing the other side of said pan to the other of said side walls.

19. A self-propelled vehicle which comprises a vehicle body having a floor, rotatably mounted wheels adapted to carry said vehicle body, a motor operatively connected to said wheels for rotating same to propel the vehicle, a ballast pan disposed underneath said floor of said vehicle body, means for lowering and elevating relatively to said floor each end of said ballast pan, at least one end of said ballast pan having an edge disposed transversely to a direction of travel of the vehicle adapted for scooping up earth, side wall members secured to said ballast pan along and adjacent the side edges thereof, and end wall members secured to said floor, said ballast pan and said side and end wall members providing a compartment for ballast confined by the upper surface of said ballast pan, the under surface of said floor and the inner surfaces of said side and end wall members, said end of said ballast pan when in lowered position being substantially spaced from the lower margin of the end wall member that is contiguous therewith when said end of said ballast pan is in elevated position.

20. A self-propelled vehicle which comprises a vehicle body having a floor, rotatably mounted wheels adapted to carry said vehicle body, a motor operatively connected to said wheels for rotating same to propel the vehicle and a ballast compartment disposed underneath the floor of said vehicle body, said ballast compartment comprising a bottom pan spaced from said floor, side walls extending between said bottom pan and the under surface of said floor, and means for lowering and elevating at least one end of said bottom pan, said side walls comprising means whereby said side walls may be vertically extended and contracted upon lowering and raising said pan relative to said floor.

21. A vehicle which comprises rotatably mounted carrying wheels, a body carried by said wheels, a horizontally disposed pan, raising and lowering means adjacent each end of said pan, said raising and lowering means having upper ends secured to said body and lower ends connected to said pan and said raising and lowering units being selectively activatable for raising and lowering each end of said pan, an earth-cutting and receiving edge at at least one end of said pan disposed transversely to a direction of travel of the vehicle, and longitudinally extensible vertically disposed strut means the lower end of which is secured to said pan adjacent each side thereof and the upper end of which is rigidly secured to said body for holding said pan against horizontal movement relative to said body when said vehicle is operated to bring said earth-receiving edge into pressure contact with a body of earth, said pan being connected to the lower ends of said raising and lowering means and to the lower ends of said strut means by readily releasable securing means.

22. A vehicle according to claim 21 wherein the upper ends of said raising and lowering means are secured to said body of said vehicle by hinge means permitting swinging movement of the lower ends thereof for facilitating engagement and disengagement thereof with said pan.

23. A self-propelled vehicle which comprises a vehicle body comprising two end sections and a central section therebetween, each section having a floor and side walls and said sections being secured together to provide a vehicle body, a carrying wheel rotatably mounted with respect to each side wall of each of said end sections, engine means disposed in said central section, power-transmitting means operatively connected to the carrying wheels for at least one of said end sections which passes through said side walls from said central section to the interior of said end section and from the interior of said end section to the carrying wheels for said end section, a hollow projection extending laterally from each side of at least one of said end sections, pivot means which is carried adjacent the end of each of said hollow projections and which carries one of said wheels in operative relation to said power transmission means for pivotal movement about a vertical axis, and means within each of said hollow projections for effecting said pivotal movement responsive to movement of a part actuatable by the vehicle operator.

24. A self-propelled vehicle according to claim 7 which comprises longitudinally extensible vertically disposed strut means the lower end of which is secured to said pan adjacent each side thereof and the upper end of which is rigidly secured to said body for holding said pan against horizontal movement relative to said body when said vehicle is operated to bring said earth-receiving edge into pressure contact with a body of earth, the lower ends of said raising and lowering means and of said strut means, respectively, being secured to said pan by readily releasable securing means so that said pan may be readily detached from and reattached to said raising and lowering means and said strut means.

References Cited in the file of this patent

UNITED STATES PATENTS

| Number | Name | Date |
|---|---|---|
| 953,406 | Beam | Mar. 29, 1910 |
| 1,105,469 | Utterback | July 28, 1914 |
| 1,296,347 | Werts et al. | Mar. 4, 1919 |
| 1,407,486 | Sandberg | Feb. 21, 1922 |
| 1,479,687 | Wilson | Jan. 1, 1924 |
| 1,550,498 | Brown | Aug. 18, 1925 |
| 1,672,613 | Howell | June 5, 1928 |
| 2,000,709 | Matthews | May 7, 1935 |
| 2,257,772 | Wolf | Oct. 7, 1941 |
| 2,322,358 | Hansen | June 22, 1943 |
| 2,330,218 | Jones | Sept. 28, 1943 |
| 2,397,791 | Kramer et al. | Apr. 2, 1946 |
| 2,656,055 | Longenecker | Oct. 20, 1953 |
| 2,702,438 | Ballu | Feb. 22, 1955 |

FOREIGN PATENTS

| Number | Country | Date |
|---|---|---|
| 245,311 | Switzerland | July 16, 1947 |